US012123583B1

(12) United States Patent
Guo et al.

(10) Patent No.: US 12,123,583 B1
(45) Date of Patent: Oct. 22, 2024

(54) MICROLED LIGHTING MODULE

(71) Applicant: GM Global Technology Operations LLC, Detroit, MI (US)

(72) Inventors: Yujie Guo, Thornhill (CA); Jonglee Park, Novi, MI (US); Julien P. Mourou, Bloomfield Hills, MI (US); Bradley Allen Newcomb, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/488,892

(22) Filed: Oct. 17, 2023

(51) Int. Cl.
*F21V 29/87* (2015.01)
*F21K 9/69* (2016.01)
*F21V 5/00* (2018.01)
*F21W 104/00* (2018.01)
*F21Y 115/10* (2016.01)

(52) U.S. Cl.
CPC ................ *F21V 29/87* (2015.01); *F21K 9/69* (2016.08); *F21V 5/004* (2013.01); *F21W 2104/00* (2018.01); *F21Y 2115/10* (2016.08)

(58) Field of Classification Search
CPC . F21V 29/87; F21V 5/004; F21K 9/69; F21Y 2115/10; F21W 2104/00
See application file for complete search history.

(56) References Cited

U.S. PATENT DOCUMENTS

2016/0245963 A1* 8/2016 Ge ...................... G02B 5/0242
2021/0111319 A1* 4/2021 Lutgen ................... F21V 5/004
2023/0084891 A1 3/2023 Vasylyev

FOREIGN PATENT DOCUMENTS

DE 112017002890 2/2019
DE 202020100523 4/2020

OTHER PUBLICATIONS

Jo, CN 109099328, Sep. 2020 (Year: 2020).*
Val et al., CN 114616664, Jun. 2022 (Year: 2022).*
Iwata, WO 2022091310, May 2022 (Year: 2022).*

* cited by examiner

*Primary Examiner* — Mary Ellen Bowman
(74) *Attorney, Agent, or Firm* — Honigman LLP; Matthew H. Szalach; Jonathan P. O'Brien

(57) ABSTRACT

A microLED lighting module is disclosed. The microLED lighting module includes a micromodule having one or more transparent polymer layers thereon. Additionally, the one or more transparent polymer lavers are configured to maintain a temperature of the microLED lighting module below approximately 220° C.

18 Claims, 5 Drawing Sheets

MICROLED LIGHTING MODULE

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a microLED lighting module.

Vehicles typically include various external lighting modules. The lighting modules may be headlights, tail lights, or other external vehicle lighting. Traditional lighting modules are comprised of LCDs which are then coupled to exterior body panels during vehicle assembly. As body panels require a lightweight, yet high-strength design, the body panels are typically produced using an injection-molding process. However, as lighting modules are easily damaged by heat from an injection-molding process, the lighting modules must be produced separately from the body panel.

Moreover, coupling of the lighting module and the body panels requires the use of seal elements to prevent moisture from entering the lighting module. As seal elements are prone to failure that can result in damage to the lighting module, a need for an integrated lighting module remains.

SUMMARY

In some examples, a microLED lighting module includes a micromodule having one or more transparent polymer layers thereon. Additionally, the one or more transparent polymer layers is configured to maintain a temperature of the microLED lighting module below approximately 220 degrees Celsius (° C.). In some examples, the one or more transparent polymer layers is a plurality of transparent polymer layers. In some examples, the one or more transparent polymer layers is produced by overmolding. In some examples, the one or more transparent polymer layers is comprised of one or more of polycarbonate, acrylonitrile styrene acrylate, or polymethyl methacrylate. Additionally, in some examples, the one or more transparent polymer layers is filled with hollow glass microspheres. Moreover, in some examples, a body panel for a vehicle includes the microLED lighting module. Additionally, in some examples, a vehicle incorporates the microLED lighting module.

In some examples, a microLED lighting module includes a backplane configured to be coupled to a power source. The microLED lighting module also includes a micromodule coupled to the backplane and configured to be powered by the power source. Additionally, the microLED lighting module includes a transparent polymer layer disposed over the micromodule. In some examples, the transparent polymer layer is also disposed over the backplane. In some examples, the transparent polymer layer is coupled to the micromodule through overmolding. In some examples, the transparent polymer layer is coupled to the micromodule through thermoforming. In some examples, the transparent polymer layer is a plurality of transparent polymer layers. In some examples, the transparent polymer layer is comprised of one or more of polycarbonate, acrylonitrile styrene acrylate, or polymethyl methacrylate. In some examples, a body panel incorporates the microLED lighting module. Additionally, in some examples, a vehicle incorporates the microLED lighting module.

In some examples, a body panel for a vehicle includes a polymer body panel portion and a micromodule. In some examples, the micromodule is a one-dimensional or two-dimensional array. Additionally, the micromodule is a plastic polymer and comprised of one or more of polyethylene Terephthalate, polymethyl methacrylate, or polycarbonate. Additionally, the body panel includes a backplane coupled to the micromodule and configured to provide electrical connection to the micromodule. Moreover, the body panel includes a high thermal conductivity window frame disposed about the micromodule and adjacent to the polymer body panel portion. Additionally, the body panel is configured to be formed through an injection-molding process, which heats the body panel portion to a temperature greater than approximately 220° C., and the microLED lighting module remains below approximately 220° C. during the injection-molding process. In some examples, the high thermal conductivity window frame is comprised of one or more of copper or aluminum. In some examples, the body panel also includes a transparent polymer layer disposed between the polymer body panel portion and the micromodule. In some examples, the transparent polymer layer is a plurality of transparent polymer layers. In some examples, a vehicle incorporates the body panel.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
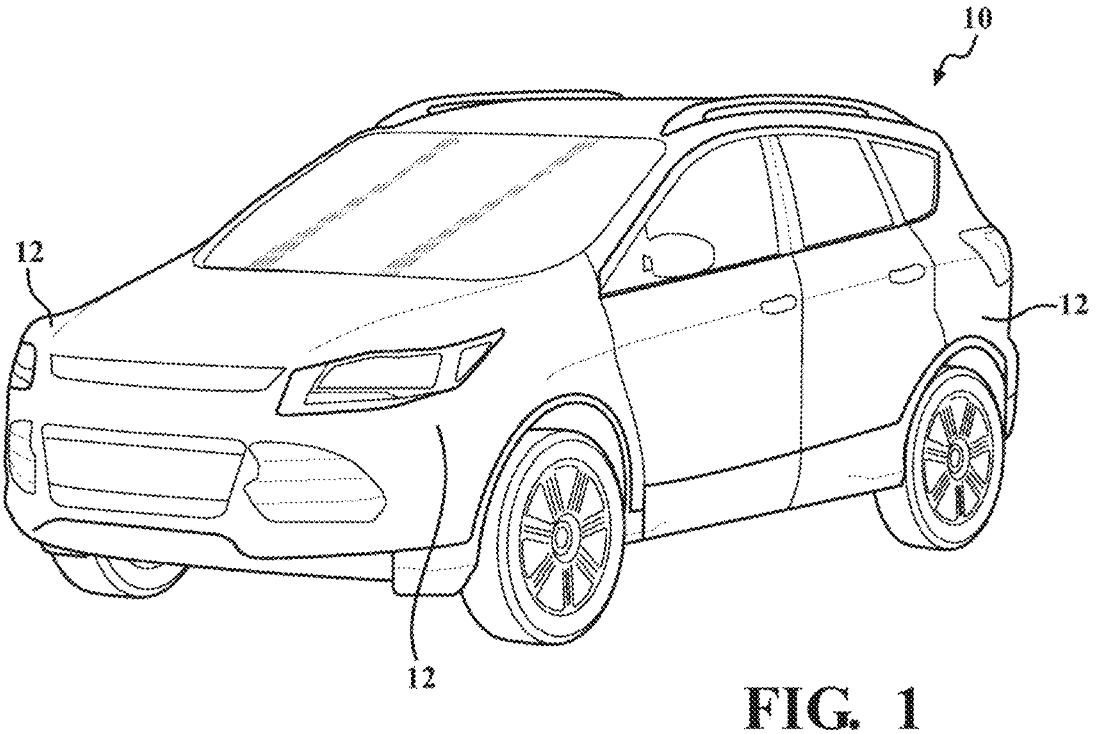
FIG. 1 is a perspective view of a vehicle exterior.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on." "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between." "adjacent" versus "directly adjacent," etc.). As used herein, the term "and/or" includes any and all combinations of one or more of the associated listed items.

The terms "first," "second." "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first." "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC): a digital, analog, or mixed analog/digital discrete circuit: a digital, analog, or mixed analog/digital integrated circuit: a combinational logic circuit: a field programmable gate array (FPGA): a processor (shared, dedicated, or group) that executes code: memory (shared, dedicated, or group) that stores code executed by a processor: other suitable hardware components that provide the described functionality: or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app." or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof.

These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., . . . an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Referring first to FIG. 1, a vehicle is illustrated at 10. An exterior of the vehicle 10 includes a plurality of exterior body panels 12 coupled to various exterior lighting modules. The body panels 12 are generally large, uniquely shaped sections. These sections provide a solid mount and covering for vehicle systems and protect occupants from elements and during collisions. Due to the unique shape and necessary strength requirements, the body panels 12 are generally comprised of polymers and produced through an injection-molding process. The injection-molding process is a forming process using molds. Materials such as synthetic resins or plastics are heated and melted, and then sent to a mold 14 where they are shaped. Once the desired shape has been formed, the body panel 12 is cooled and then removed from the mold 14 to be assembled onto the vehicle 10.

Many exterior lighting modules are required by law for safety reasons including, but not limited to, headlamps, tail lamps, and center high-mounted stop lights (CHMSL). As lighting modules are heat-sensitive, the exterior lighting modules are assembled separately and then assembled into the body panels 12 in a separate step to avoid damage to the lighting modules during injection molding or other forming processes. However, assembling separate components requires additional components such as seals and often leads to failure of lighting modules due to water leakage between the assembled components.

FIGS. 1-8 illustrate a microLED lighting module 20 that overcomes these draw backs. The microLED lighting module 20 includes a micromodule 22 and a backplane 24.

The micromodule 22 is a one-dimensional array or a two-dimensional array of micro elements. In some examples, the micromodule 22 is a small module having a diameter of less than one (1) millimeter. Common micromodule 22 sizes include diameters of approximately one hundred (100) micrometers to approximately ten (10)) micrometers, however, various other sizes have been contemplated. In some examples, the micromodule 22 is a microLED array consisting of a plurality of microscopic LEDs, which form a display. In one configuration, the micromodule 22 includes more than 1,000 microLEDs. Additionally, in some examples, the micromodule 22 includes more than 10,000 microLEDs. In some examples, the micromodule 22 includes more than 100,000 microLEDs. Additionally, in some examples, the micromodule 22 includes more than 1,000,000 microLEDs. However, various other configurations have also been contemplated.

Additionally, in some examples, the micromodule 22 is comprised of a plastic polymer and includes one or more of Polyethylene Terephthalate (PET), Polymethyl Methacrylate (PMMA), or Polycarbonate (PC). However, various other materials have been contemplated. The micromodule 22 may be any size and shape configured to display the desired lighting effect.

As illustrated in the example shown in FIGS. 2-8, the microLED lighting module 20 also includes the backplane 24. The backplane 24 is configured to be coupled to the micromodule 22. In some examples, the backplane 24 is configured to be coupled to each microLED of the micromodule 22 such that the backplane 24 extends along an entire surface of the micromodule 22.

The backplane 24 may be comprised of any substrate responsible for carrying the function of the microLED lighting module 20, such as a printed circuit board (PCB) or the like. The backplane 24 may be shaped and size to fit the micromodule 22 and is configured to distribute functions including power supplies, signals etc. to each microLED such that appropriate electrical connection and signal transmission can be obtained. Additionally, the backplane 24 may be configured to be coupled to a power source (not shown) through a cable 26 or other coupling mechanism.

Figure 3A:
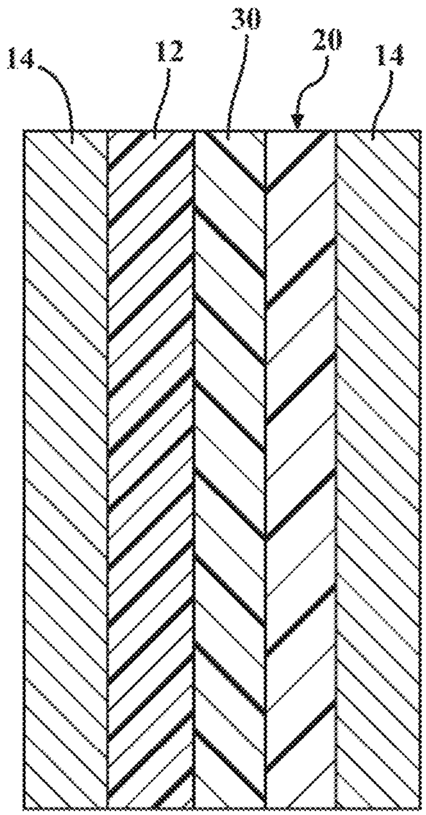
FIG. 3A is cross-sectional view of a body panel being formed in a mold according to one aspect of the disclosure.

In some examples, such as the example shown in FIG. 3A, the microLED lighting module 20 also includes a transparent polymer layer 30 disposed on one or more of the micromodule 22 or the backplane 24 of the microLED lighting module 20. The transparent polymer layer 30 is generally clear such that light is visible through the transparent polymer layer 30. Additionally, it is contemplated that the transparent polymer layer 30 may be colored to match a color of the body panel or other vehicle components. Moreover, it is contemplated that, in some examples, the transparent polymer layer 30 may also be translucent or opaque, if desired. Further, it is contemplated that a portion of the transparent polymer layer 30 may be clear while another portion of the transparent polymer layer 30 may be colored and/or translucent or opaque.

In some examples, the transparent polymer layer 30 is comprised of one or more of polycarbonate (PC), acrylonitrile styrene acrylate (PSA), or polymethyl methacrylate (PMMA). However, various other compositions have been contemplated. Additionally, in some examples, the transparent polymer layer 30 is disposed over the micromodule 22 opposite the backplane 24. In some examples, the transparent polymer layer 30 is disposed over both the micromodule 22 and the backplane 24. In some examples, such as the example shown in FIG. 5, the transparent polymer layer 30 may completely surround the microLED lighting module 20 leaving only the cable 26 extending therefrom to couple to the power source. Additionally, in some examples, the transparent polymer layer 30 may be thermoformed over one or more of the micromodule 22 and the backplane 24.

Additionally, the transparent polymer layer 30 is configured to maintain a temperature of the microLED lighting module 20 below approximately 220 degrees Celsius (C). In some examples, the transparent polymer layer 30 is configured to maintain a temperature of the microLED lighting module 20 below approximately 200° C. In some examples, the transparent polymer layer 30 is configured to maintain a temperature of the microLED lighting module 20 below approximately 150° C. In some examples, the transparent polymer layer 30 is configured to maintain a temperature of the microLED lighting module 20 below approximately 135° C.

Figure 3B:
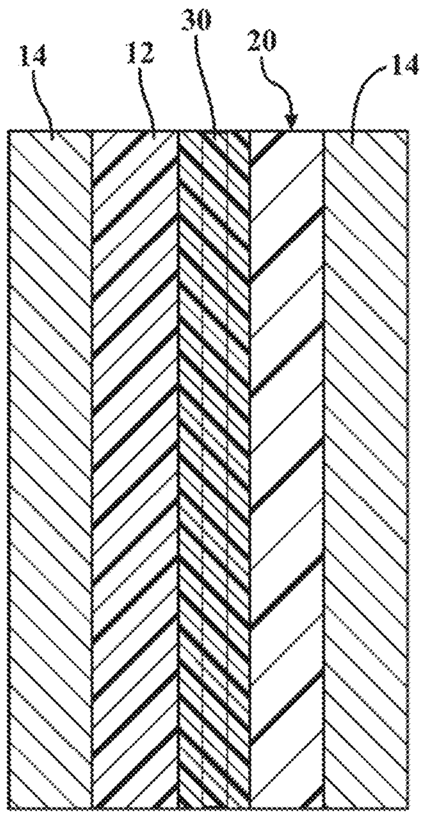
FIG. 3B is a cross-sectional view of a body panel being formed in a mold according to one aspect of the disclosure.

In some examples, such as the example shown in FIG. 3B, the transparent polymer layer 30 may be comprised of multiple transparent polymer layers 30 disposed on top of one another. The multiple layers of the transparent polymer layer 30 add to the thermal insulation provided to the microLED lighting module 20 by the layer 30 when the microLED lighting module 20 is molded onto the body panel 12, as will be described in greater detail below. In the illustration shown in FIG. 3B, the multiple layers are shown by using different crosshatching as compared to the transparent polymer layer 30 shown in FIG. 3A. Further, the multiple transparent polymer layers 30 are shown as including three (3) substantially identical sheets having the same length that are stacked on top of one another. Alternatively, one or more of the transparent polymer layers 30 may be filled with hollow glass microspheres to provide a low density, low thermal conductivity polymer layer 30 such that at least one of the layers 30 is different than the other layers 30. Finally, while the transparent polymer layer 30 is shown as including three (3) sheets, the transparent polymer layer 30 could include any number of sheets-greater than or less than three (3) sheets.

Referring still to the example shown in FIGS. 2-5, to create a multi-layer transparent polymer layer 30, one transparent polymer layer may be thermoformed with a second transparent polymer layer to create the transparent polymer layer 30 having multiple transparent polymer layers 30. It is also contemplated that more than two transparent polymer layers 30 may be thermoformed together (see FIG. 3B) to create the multi-layer transparent polymer layer 30.

In some examples, once the transparent polymer layer 30 is formed, it may be coupled to one or more of the micromodule 22 and/or the backplane 24. For example, in the example shown in FIG. 4, the transparent polymer layer 30 is coupled to the backplane 24. In another example, shown in FIG. 5, the transparent polymer layer 30 is coupled to both the backplane 24 and the micromodule 22. Other configurations have also been contemplated. In some examples, the coupling of the transparent polymer player 30 and the one or more of the micromodule 22 and/or the backplane 24 is done through a thermoforming process. Additionally or alternatively, in some examples, such as the examples illustrated in FIG. 2, the transparent polymer layer 30, such as PC or PSA, may be overmolded onto the micromodule 22 using an injection-molding process or an injection-compression-molding process.

Figure 2:
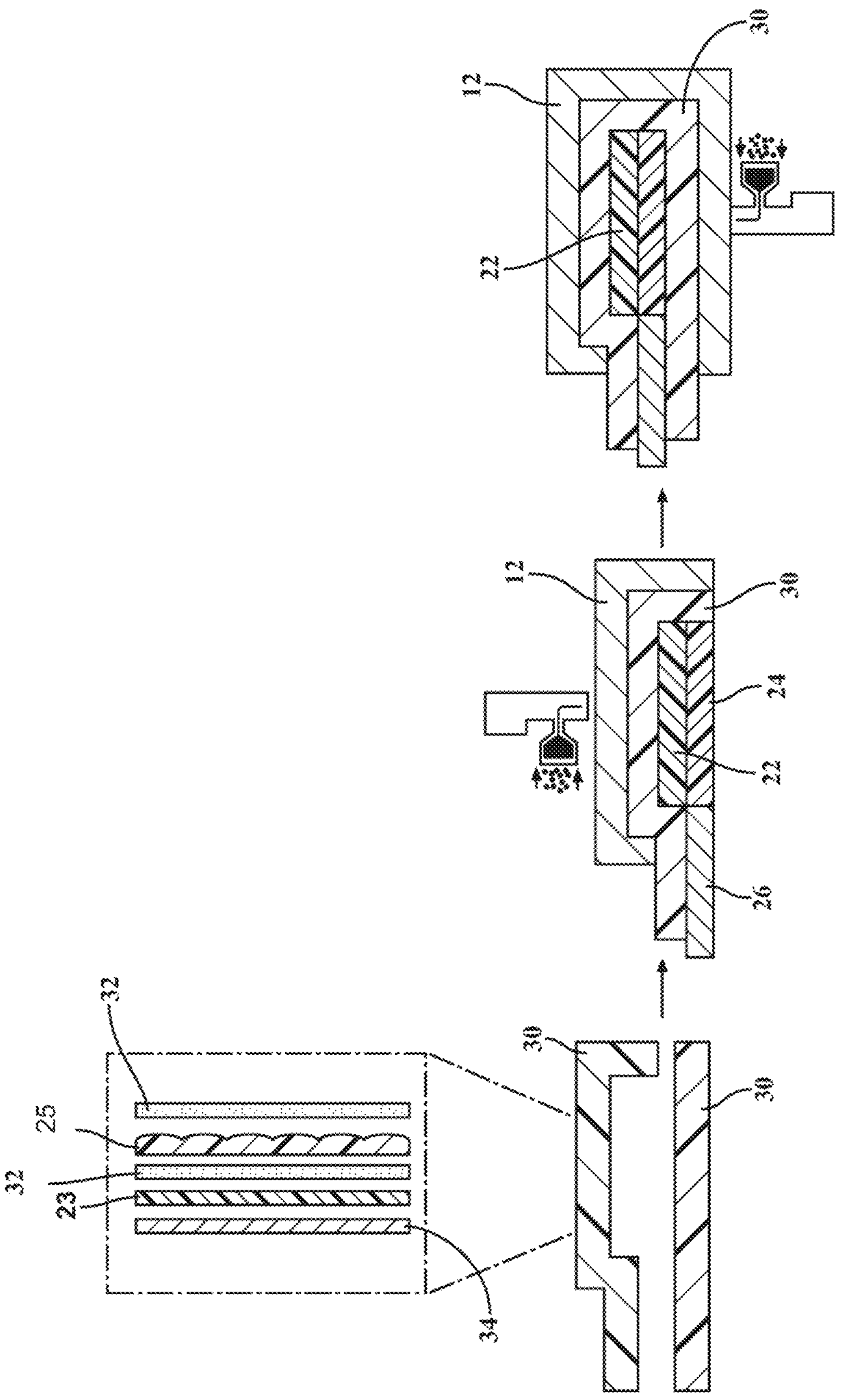
FIG. 2 is schematic view of a microLED lighting module and body panel being formed via an injection-molding process according to one aspect of the disclosure.

In some examples, the microLED lighting module 20 once formed may then be further processed into the body panel 12. In the example shown in FIG. 2, the transparent polymer layer 30 is a multiple-layer film including one or more layers of an optical coupling agent 32 to help facilitate coupling between the microLED lighting module 20 and the body panel 12, a polycarbonate or other polymer-compatible layer 23, and a graphene layer 34 or other additional layer that provides additional conductivity and/or strength to the microLED lighting module 20 and/or the body panel 12 when the transparent polymer layer 30 is attached to the microLED lighting module 20 and subsequently overmolded onto the body panel 12. The multiple-layer film of the transparent polymer layer 30 may also include a microlens array 25 that is disposed over the micromodule 22 when the transparent polymer layer 30 is attached to the micromodule 22, as shown in FIG. 2. A lighting pattern of the micromodule 22 can be designed through the overlay from the microlens array 25 once the transparent polymer layer 30 is attached to the micromodule 22.

Figure 4:
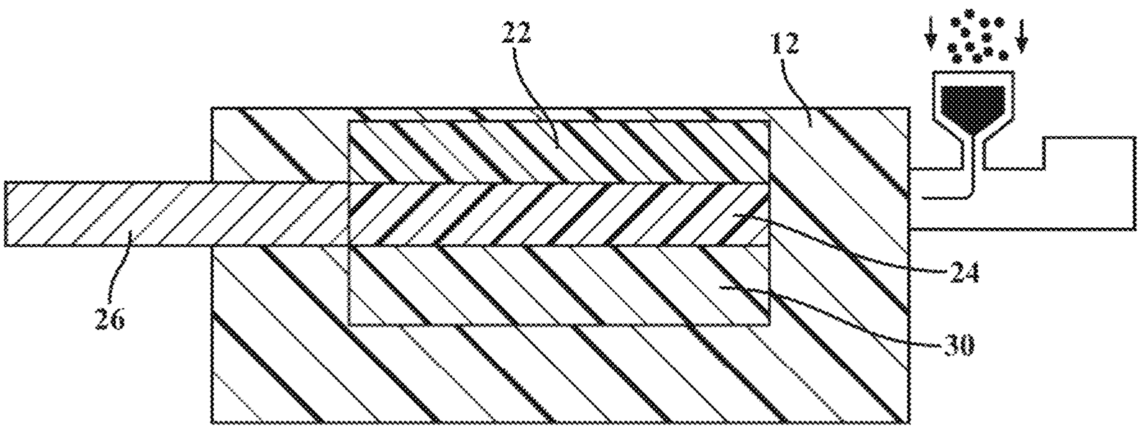
FIG. 4 is a schematic view of the microLED lighting module being formed according to one aspect of the disclosure.
Figure 5:
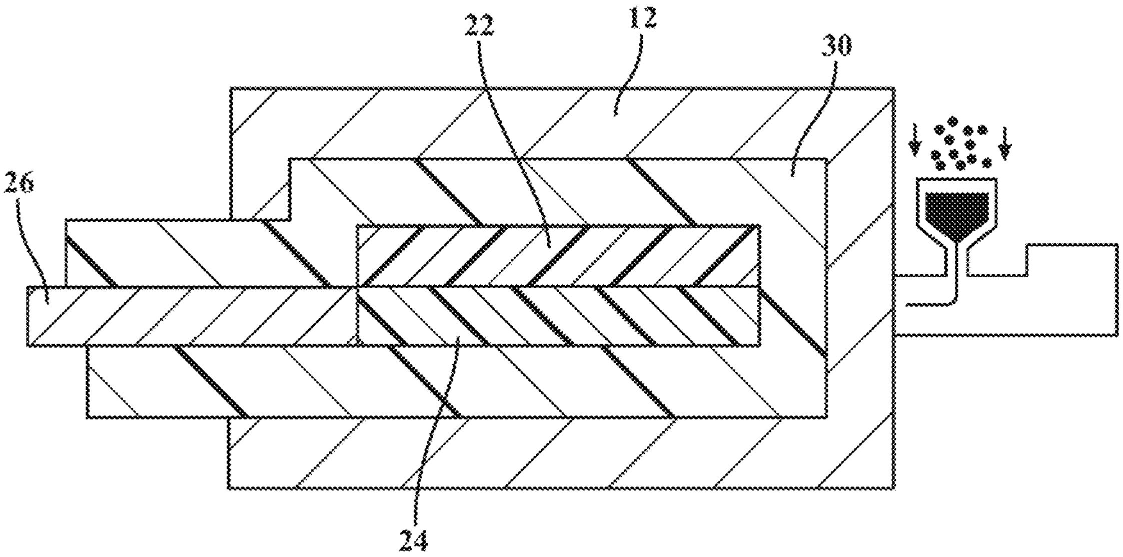
FIG. 5 is a schematic view of the microLED lighting module being formed according to one aspect of the disclosure.

Referring now to the example shown in FIG. 4, as described above, the transparent polymer layer 30 may be thermoformed to the micromodule 22. In some examples, the optical coupling agent 32 or adhesive may be disposed between the micromodule 22 or the backplane 24 and the transparent polymer layer 30. Additionally, it is contemplated that the transparent polymer layer 30 may be thermoformed or otherwise coupled to another transparent polymer layer 30 prior to being thermoformed on the micromodule 22 and/or the backplane 24. Once the transparent polymer layer 30 is thermoformed onto the micromodule 22, the transparent polymer layer 30 may be trimmed to a desired size and the microLED lighting module 20 is formed. The microLED lighting module 20 may then be further processed in an overmolding or other high-heat processes without causing damage to the micromodule 22, as illustrated in FIG. 5.

Figure 6:
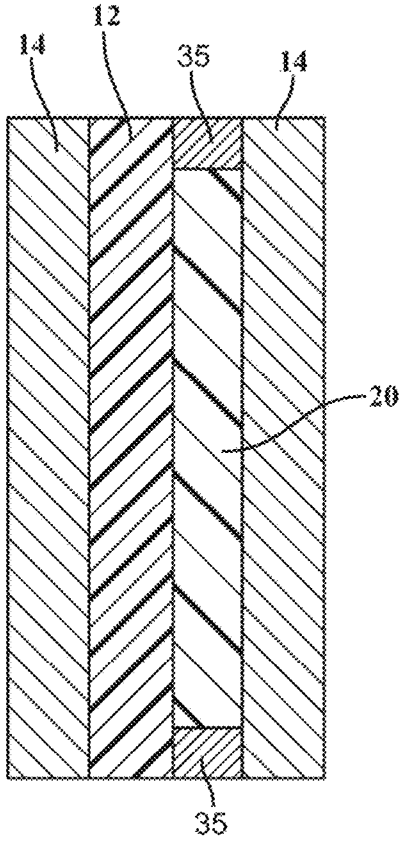
FIG. 6 is a cross-sectional view of a body panel being formed in a mold according to one aspect of the disclosure.
Figure 7:
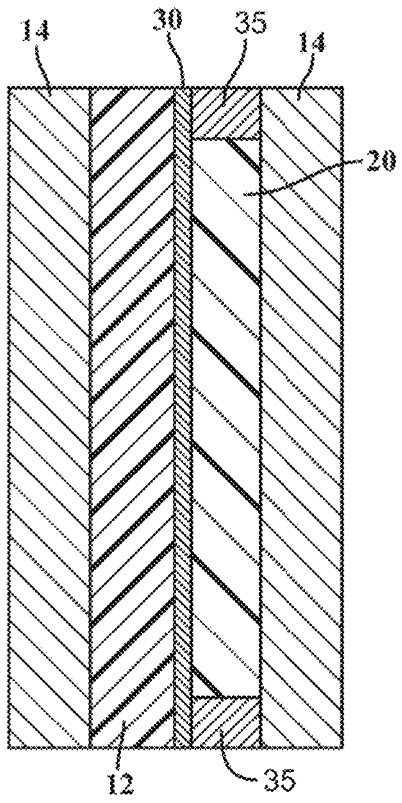
FIG. 7 is a cross-sectional view of a body panel being formed in a mold according to one aspect of the disclosure.
Figure 8:
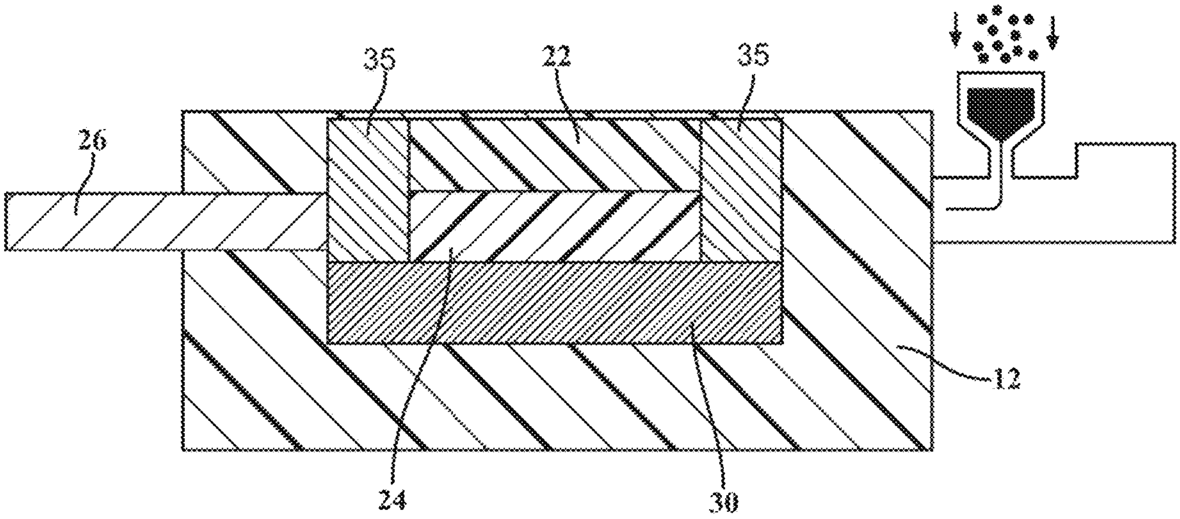
FIG. 8 is a schematic view of the microLED lighting module being formed according to one aspect of the disclosure.

Additionally or alternatively, the micromodule 22 and the backplane 24 may be coupled to a high thermal conductivity window frame 35, as illustrated in the example shown in FIGS. 6-8. The high thermal conductivity window frame 35 may be comprised of one or more of aluminum or copper. As illustrated in FIGS. 6-8, the high thermal conductivity window frame 35 is generally rectangular having an aperture defined therethrough. The micromodule 22 and the backplane 24 are disposed through the aperture such that the high thermal conductivity window frame 35 surrounds the micromodule 22 and the backplane 24 on four sides. In this example, when the microLED lighting module 20 has a polymer overmolded onto it, heat from the injection-molding process is dissipated to a surface of the mold 14 and away from the microLED lighting module 20, thereby preventing damage to the microLED lighting module 20.

The microLED lighting module 20 may include the transparent polymer layer 30 disposed over both the micromodule 22 and the high thermal conductivity window frame 35 (FIG. 7) to assist is dissipating heat from the injection-molding process to the surface of the mold 14. In so doing, heat is dissipated away from the microLED lighting module 20 during the injection-molding process and during further processing such as overmolding, in an effort to protect the microLED lighting module 20.

In operation, the micromodule 22 is coupled to the backplane 24. In some examples, the transparent polymer layer 30 is then injection molded onto one or more of the micromodule 22 or the backplane 24, as shown in FIG. 2. In some examples, the transparent polymer layer 30 is thermoformed onto one or more of the micromodule 22 or the backplane 24, as shown in FIG. 4. As shown in FIG. 4, the transparent polymer layer 30 may include multiple layers. In some examples, the high thermal conductivity window frame 35 is coupled about the micromodule 22 and the backplane 24, as shown in FIGS. 6-8. Additionally, the transparent polymer layer 30 may be disposed over the micromodule 22, the backplane 24, and the high thermal conductivity window frame 35. The microLED lighting module 20 is then overmolded with a polymer forming the body panel 12 such that the microLED lighting module 20 and the body panel 12 are a single, integral piece.

The microLED lighting module 20 as described herein is configured to withstand high temperatures without damage and without diming or otherwise affecting the micromodule 22. For example, the microLED lighting module 20 can be placed in a desired mold to have exterior body panels 12 overmolded thereon without damage to the microLED lighting module 20. The microLED lighting module 20, as described herein, is configured to be integrated into the body panel 12 such that the microLED lighting module 20 and the body panel 12 form a single, integral piece. Further, the integral body panel 12 and the microLED lighting module 20 eliminate the need for additional seals or other components along with additional manual coupling steps.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A body panel for a vehicle, the body panel comprising:
- a polymer body panel portion;
- a micromodule comprising a one-dimensional array or a two-dimensional array, the micromodule being a plastic polymer and comprising one or more of polyethylene terephthalate, polymethyl methacrylate, or polycarbonate;
- a backplane coupled to the micromodule and configured to provide an electrical connection to the micromodule; and
- a high thermal conductivity window frame surrounding the micromodule and located adjacent to the polymer body panel portion, wherein the body panel is configured to be formed through an injection-molding process that heats the body panel portion to a temperature greater than approximately 220° C. within a mold, and wherein the micromodule and the backplane remain below approximately 220° C. during the injection-molding process within the mold.

2. The body panel of claim 1, wherein the high thermal conductivity window frame is comprised of one or more of copper and aluminum.

3. The body panel of claim 1, further comprising a transparent polymer layer disposed between the polymer body panel portion and the micromodule.

4. The body panel of claim 3, wherein the transparent polymer layer comprises a plurality of transparent polymer layers.

5. A vehicle incorporating the body panel of claim 1.

6. A body panel for a vehicle, the body panel comprising:
- a polymer body panel portion;
- a micromodule comprising a one-dimensional array or a two-dimensional array, the micromodule being a plastic polymer;
- a backplane coupled to the micromodule and configured to provide an electrical connection to the micromodule; and
- a high thermal conductivity window frame surrounding the micromodule and located adjacent to the polymer body panel portion, wherein the body panel is configured to be formed through an injection-molding process that heats the body panel portion to a temperature greater than approximately 220° C. within a mold, and wherein the micromodule and the backplane remain below approximately 220° C. during the injection-molding process within the mold.

7. The body panel of claim 6, wherein the plastic polymer comprises one or more of polyethylene terephthalate, polymethyl methacrylate, or polycarbonate.

8. The body panel of claim 6, wherein the high thermal conductivity window frame is comprised of one or more of copper and aluminum.

9. The body panel of claim 6, further comprising a transparent polymer layer disposed between the polymer body panel portion and the micromodule.

10. The body panel of claim 9, wherein the transparent polymer layer comprises a plurality of transparent polymer layers.

11. A vehicle incorporating the body panel of claim 6.

12. A body panel for a vehicle, the body panel comprising:
- a polymer body panel portion;
- a micromodule comprising a one-dimensional array or a two-dimensional array, the micromodule being a plastic polymer and comprising one or more of polyethylene terephthalate, polymethyl methacrylate, or polycarbonate;
- a backplane coupled to the micromodule and configured to provide an electrical connection to the micromodule; and
- a high thermal conductivity window frame surrounding the micromodule and located adjacent to the polymer body panel portion, wherein the body panel is configured to be formed through an injection-molding process.

13. The body panel of claim 12, wherein the injection-molding process heats the body panel portion to a temperature greater than approximately 220° C. within a mold.

14. The body panel of claim 13, wherein the micromodule and the backplane remain below approximately 220° C. during the injection-molding process within the mold.

15. The body panel of claim 12, wherein the high thermal conductivity window frame is comprised of one or more of copper and aluminum.

16. The body panel of claim 12, further comprising a transparent polymer layer disposed between the polymer body panel portion and the micromodule.

17. The body panel of claim 16, wherein the transparent polymer layer comprises a plurality of transparent polymer layers.

18. A vehicle incorporating the body panel of claim 12.

* * * * *